(12) United States Patent
Kruer et al.

(10) Patent No.: US 9,297,286 B2
(45) Date of Patent: Mar. 29, 2016

(54) AFTERTREATMENT SYSTEM FOR AN ENGINE

(71) Applicant: Cummins Emission Solutions Inc., Columbus, IN (US)

(72) Inventors: Justin Kruer, Franklin, IN (US); Atul Abhyankar, Columbus, IN (US); John Ringstad, Stoughton, WI (US); Ken Hummel, Barneveld, WI (US)

(73) Assignee: CUMMINS EMISSION SOLUTIONS INC., Columbus, IN (US)

( * ) Notice: Subject to any disclaimer, the term of this patent is extended or adjusted under 35 U.S.C. 154(b) by 559 days.

(21) Appl. No.: 13/666,072

(22) Filed: Nov. 1, 2012

(65) Prior Publication Data
US 2013/0199160 A1    Aug. 8, 2013

Related U.S. Application Data

(60) Provisional application No. 61/554,384, filed on Nov. 1, 2011.

(51) Int. Cl.
| | |
|---|---|
| *F01N 3/24* | (2006.01) |
| *F01N 3/08* | (2006.01) |
| *F01N 3/20* | (2006.01) |
| *F01N 3/035* | (2006.01) |
| *F01N 13/00* | (2010.01) |
| *F01N 3/10* | (2006.01) |

(52) U.S. Cl.
CPC *F01N 3/08* (2013.01); *F01N 3/035* (2013.01); *F01N 3/2066* (2013.01); *F01N 13/009* (2014.06); *F01N 13/011* (2014.06); *F01N 3/106* (2013.01); *F01N 2340/04* (2013.01); *F01N 2560/08* (2013.01); *F01N 2560/14* (2013.01); *F01N 2590/08* (2013.01); *Y02T 10/24* (2013.01)

(58) Field of Classification Search
CPC . F01N 13/009; F01N 2590/08; F01N 13/011; F01N 3/035; F01N 3/2066; F01N 13/107; F01N 2340/04
See application file for complete search history.

(56) References Cited

U.S. PATENT DOCUMENTS

| | | |
|---|---|---|
| 7,984,608 B2 | 7/2011 | Roozenboom |
| 8,136,345 B2 | 3/2012 | Liu et al. |
| 2005/0132696 A1 | 6/2005 | Tumati et al. |
| 2006/0059896 A1 | 3/2006 | Liu et al. |
| 2009/0187352 A1* | 7/2009 | Shimada et al. ............... 702/22 |
| 2011/0023466 A1 | 2/2011 | Branco et al. |
| 2011/0138785 A1 | 6/2011 | Birkby et al. |
| 2012/0000181 A1 | 1/2012 | Gerges |
| 2012/0079818 A1 | 4/2012 | Svihla |
| 2012/0102928 A1 | 5/2012 | Hehle et al. |
| 2013/0000277 A1* | 1/2013 | Uzkan et al. .................. 60/274 |
| 2013/0125524 A1* | 5/2013 | Plummer et al. .............. 60/39.5 |

* cited by examiner

*Primary Examiner* — Audrey K Bradley
*Assistant Examiner* — Jonathan Matthias
(74) *Attorney, Agent, or Firm* — Foley & Lardner LLP (57) ABSTRACT

A system includes an internal combustion engine. An aftertreatment system is coupled to the internal combustion engine to receive an exhaust gas stream. The aftertreatment system comprises one or modules. Each module includes one or more emission reducing devices to reduce undesirable constituents in the exhaust gas stream from the internal combustion engine.

34 Claims, 11 Drawing Sheets

AFTERTREATMENT SYSTEM FOR AN ENGINE

CROSS-REFERENCE TO RELATED APPLICATION

The present application claims the benefit of the filing date of U.S. Provisional Application Ser. No. 61/554,384 filed on Nov. 1, 2011, which is incorporated herein by reference.

BACKGROUND

The present invention generally relates to aftertreatment systems, and more particularly, but not exclusively, relates to a modular aftertreatment system.

Aftertreatment systems are used to reduce undesirable exhaust constituents (e.g., NOx, CO, and particulate matter) of internal combustion engines such as diesel, gasoline, and natural gas to name a few types. These engines are available in various sizes and configurations, which results in aftertreatment systems of different sizes and configurations. Existing systems have shortcomings relative to certain applications. Accordingly, there remains a need for further contributions in this area of technology.

SUMMARY

One embodiment of the present invention is a unique aftertreatment system. Other embodiments include apparatuses, systems, devices, hardware, methods, and combinations for aftertreatment systems. Further embodiments, forms, features, aspects, benefits, and advantages of the present application shall become apparent from the description and figures provided herewith.

BRIEF DESCRIPTION OF THE FIGURES

The description herein makes reference to the accompanying figures wherein like reference numerals refer to like parts throughout the several views, and wherein.

DETAILED DESCRIPTION OF REPRESENTATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1:
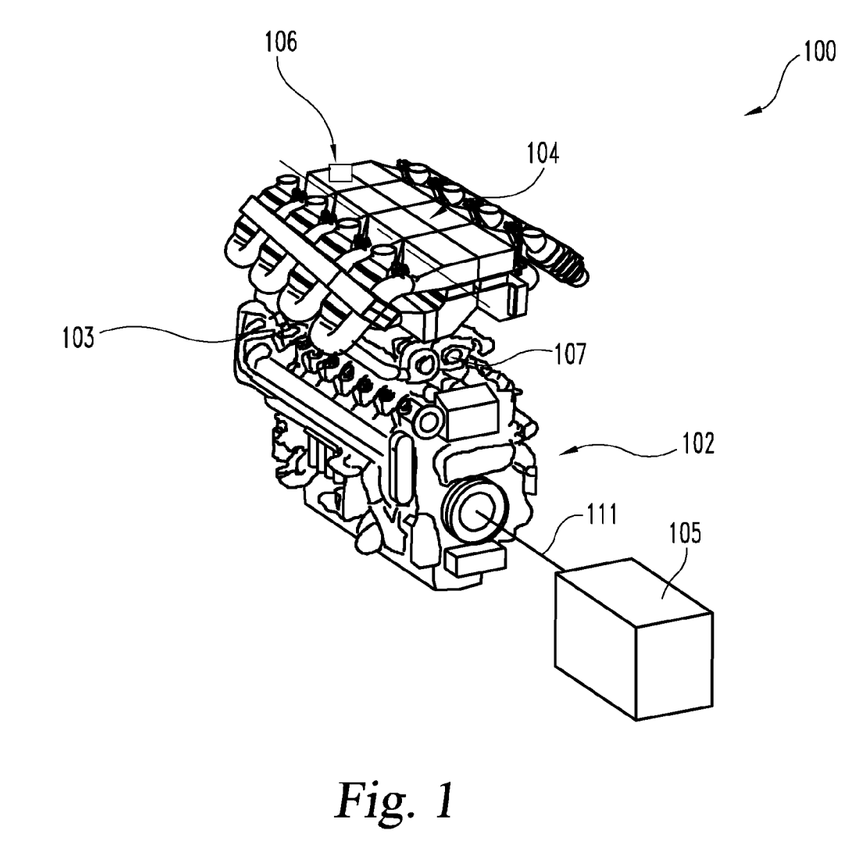
FIG. 1 is a schematic diagram of a system 100 having an engine 102 and an aftertreatment system 104.

With reference to FIG. 1, a system 100 includes an engine 102 and an aftertreatment system 104. The system 100 may be any system that utilizes an internal combustion engine including, but not limited to, locomotives, aircraft, trucks, automobiles, and power generators. The engine 102 may be any type of internal combustion engine such as diesel, gasoline, natural gas, gas turbine, microturbine, or any other type of engine or power plant. In the form of a reciprocating engine, the engine 102 may include one or more cylinders 103. The engine 102 includes an output shaft 111 defining a first direction. Output shaft 111 may drive a power absorber 105, such as a generator or an alternator, to produce electric power for various loads or may drive a pump, power motion of a vehicle, a compressor, or other type of machine. In addition, the engine 102 may include one or more turbochargers 107.

The aftertreatment system 104 includes a controller 106 structured to control operation of the aftertreatment system 104. The controller 106 may be part of the engine control module (ECM) that controls operation of the engine 102, or the controller 106 may be a separate control module.

Figure 2:
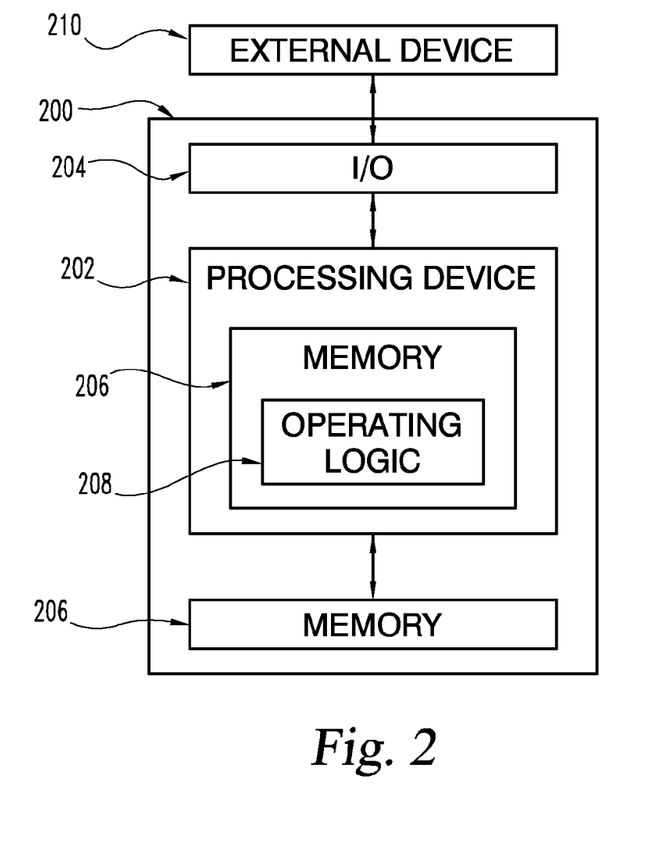
FIG. 2 is a schematic diagram of a computer 200.
Figure 11:
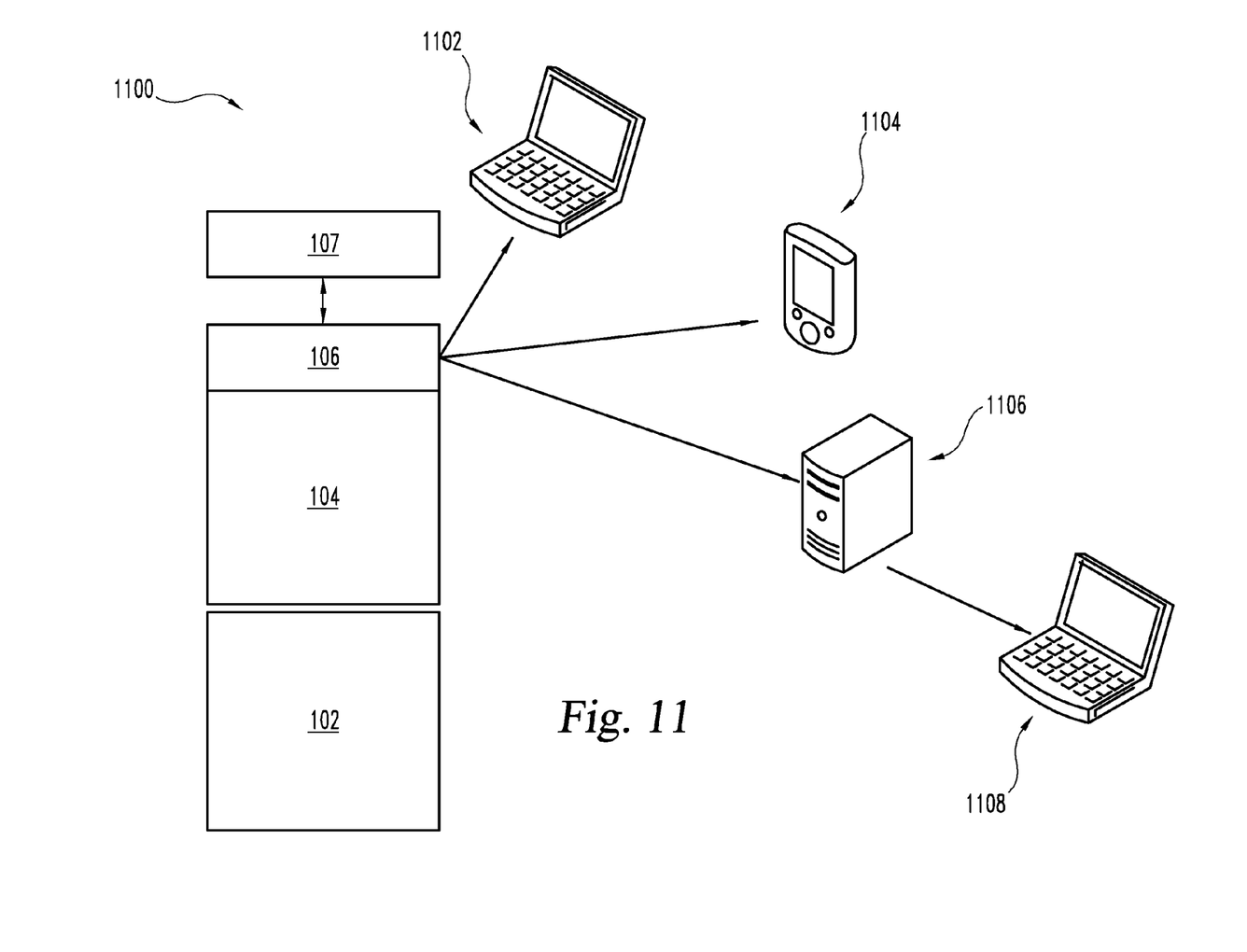
FIG. 11 is schematic diagram of a system 1100 for performing prognostics.

FIG. 2 is a schematic diagram of a computer 200. The computer 200 may be the controller 106, the computers 1102, 1108, and/or the server 1106 (FIG. 11). Computer 200 includes a processing device 202, an input/output device 204, memory 206, and operating logic 208. In other embodiments, computer 200 may take other forms. Furthermore, in some embodiments, computer 200 may communicate with one or more external devices 210.

The input/output device 204 may be any type of device that allows the computer 200 to communicate with the external device 210. For example, the input/output device may be a network adapter, a network card, or a port (e.g., a USB port, serial port, parallel port, VGA, DVI, HDMI, FireWire, CAT 5, or any other type of port). The input/output device 204 may be comprised of hardware, software, firmware, and/or state machines. It is contemplated that the input/output device 204 may include more than one network adapter, network card, or port.

The external device 210 may be any type of device that allows data to be inputted to or outputted from the computer 200. For example, the external device 210 may be another computer, a server, a handheld diagnostic tool, a controller, a printer, a display, an alarm, an illuminated indicator, a keyboard, a mouse, or a touch screen display. Furthermore, it is contemplated that the external device 210 may be integrated into the computer 200. For example, the computer 200 may be a handheld diagnostic tool, a smartphone, a laptop computer, or a tablet computer in which case the display would be an external device 210, but the display is integrated with the computer 200 as one unit, which is consistent with the general design of handheld diagnostic tools, smartphones, laptop computers, tablet computers, and the like. It is further contemplated that there may be more than one external device in communication with the computer 200. The computer 200 is one example of an external device 210.

Processing device 202 can be of a programmable type, a dedicated, hardwired state machine, or a combination of these; and can further include multiple processors, Arithmetic-Logic Units (ALUs), Central Processing Units (CPUs), or the like. For forms of processing device 202 with multiple processing units, distributed, pipelined, and/or parallel processing can be utilized as appropriate. Processing device 202 may be dedicated to performance of just the operations described herein or may be utilized in one or more additional applications. In the depicted form, processing device 202 is of a programmable variety that executes algorithms and processes data in accordance with operating logic 208 as defined by programming instructions (such as software or firmware) stored in memory 206. Alternatively or additionally, operating logic 208 for processing device 202 is at least partially defined by hardwired logic or other hardware. Processing device 202 can be comprised of one or more components of any type suitable to process the signals received from input/output device 204 or elsewhere, and provide desired output signals. Such components may include digital circuitry, analog circuitry, or a combination of both.

Memory 206 may be of one or more types, such as a solid-state variety, electromagnetic variety, optical variety, or a combination of these forms. Furthermore, memory 206 can be volatile, nonvolatile, or a mixture of these types, and some or all of memory 206 can be of a portable variety, such as a disk, tape, memory stick, cartridge, or the like. In addition, memory 206 can store data that is manipulated by the operating logic 208 of processing device 202, such as data representative of signals received from and/or sent to input/output device 204 in addition to or in lieu of storing programming instructions defining operating logic 208, just to name one example. As shown in FIG. 2, memory 206 may be included with processing device 202 and/or coupled to the processing device 202.

Figure 3:
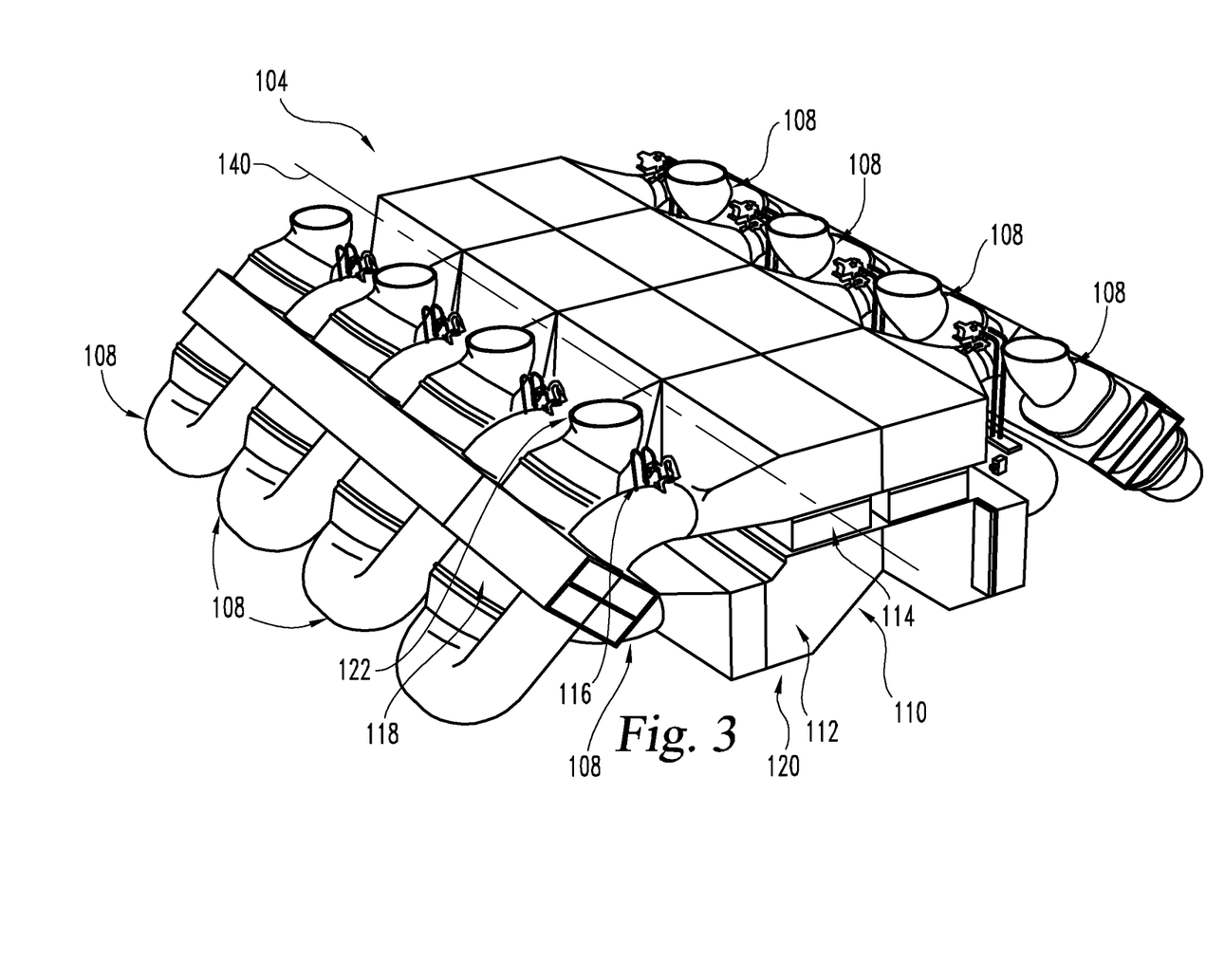
FIG. 3 is a perspective view of aftertreatment system 104.

FIG. 3 illustrates a perspective view of the aftertreatment system 104. The aftertreatment system 104 comprises one or more modules 108. In FIG. 3, eight modules 108 are shown as an example. It is alternatively contemplated that modules 108 may be paired up such that the embodiments of FIG. 3 employs four modules 108, or any other number of modules. Each module 108 may include any number and combination of emission reducing devices 110, such as a diesel oxidation catalyst (DOC) 112, a diesel particulate filter (DPF) 114, a DEF injection device 116, and a selective catalytic reduction (SCR) catalyst 118. In addition, aftertreatment system 104 may include one or more temperature control devices, such as a thermal enhancer, to improve system performance. The modules 108 include an exhaust gas stream inlet 120 and an exhaust gas stream outlet 122, which, in some embodiments, may include a muffler (not shown) or rain can (see FIG. 10). The emission reducing devices 110 are configured to reduce undesirable constituents of the exhaust gas stream generated by the engine 102.

The number of modules 108 used and the design of the modules 108 may be based on a displacement and exhaust gas flow rate of the engine 102 so that each module 108 receives a unique portion of the exhaust gas flow of engine 102. The unique portion of exhaust gas flow is understood to mean a portion of the exhaust gas flow that is entirely or substantially treated by the emissions reducing devices 110 of the respective module 108. The portions of exhaust gas flow can be commingled prior to entry into modules 108 and emission from modules 108. Moreover, the modules 108 may be designed and the emission reduction devices 110 may be sized for a given flow rate from a given number of cylinders 103 of the engine 102. For example, based on the number of cylinders 103 of a particular engine 102 and the configuration of the engine 102, the module 108 may handle one or multiple cylinders' flow rate or exhaust gas streams. Additional modules 108 may be added as displacements and flow rates increase.

In the illustrated embodiment, modules 108 are positioned in a two-dimensional array. For example, at least one module 108 is substantially located on each side of a center line 140 that parallels or is substantially parallel to output shaft 111, with two or more adjacent modules 108 on the same side of center line 140 positioned sequentially in an abutting or a closely positioned relationship to one another along center line 140. Furthermore, the paired modules 108 located on opposite sides of center line 140 are in an abutting or closely positioned relationship.

Figure 4:
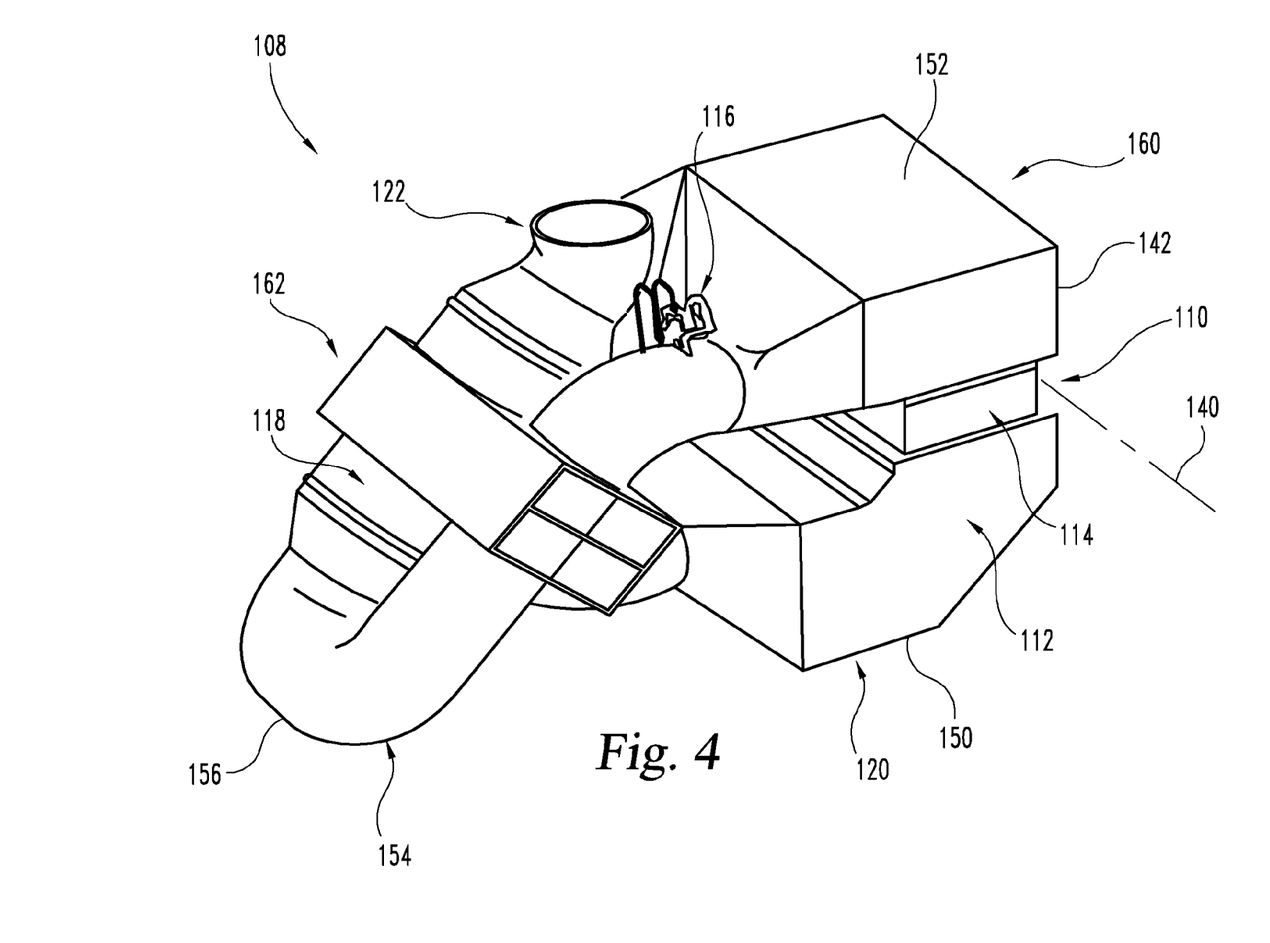
FIG. 4 is a perspective view of one embodiment of a module 108 of aftertreatment system 104.

FIG. 4 is a perspective view of one module 108 of the aftertreatment system 104. One or more modules 108 may be used to reduce emissions in the exhaust gas stream from the internal combustion engine 102. In the illustrated embodiment, each module includes an exhaust gas inlet side 150, a medial side 142 lying in, parallel to, or adjacent a plane that includes center line 140 and is vertically oriented, and an exhaust gas outlet side 152 that is opposite to exhaust gas inlet side 150.

Diesel oxidation catalyst (DOC) 112 and diesel particulate filter (DPF) 114 are arranged one above the other on median side 142. Plumbing 154 extends laterally away from the outlet of DPF 114 adjacent to outlet side 152 and away from medial side 142 toward inlet side 150 to an elbow 156. Elbow 156 is defines a 180 degree return that orients plumbing 154 toward medial side 142 and outlet side 152. SCR catalyst 118 is located downstream of elbow 156 and upstream of outlet 122 in plumbing 154. Accordingly, the DOC 112 and DPF 114 form medially positioned emission reducing component subsystem 160 connected to receive exhaust gas from the engine, while plumbing 154 and SCR catalyst 118 form a laterally positioned SCR component subsystem 162 connected to the exhaust gas outlet 122. The compact arrangement of modules 108 in a direction along and transversely to center line 140 facilitates placement of a plurality of modules 108 in a two dimensional array that minimizes the footprint of aftertreatment system 100.

Figure 5:
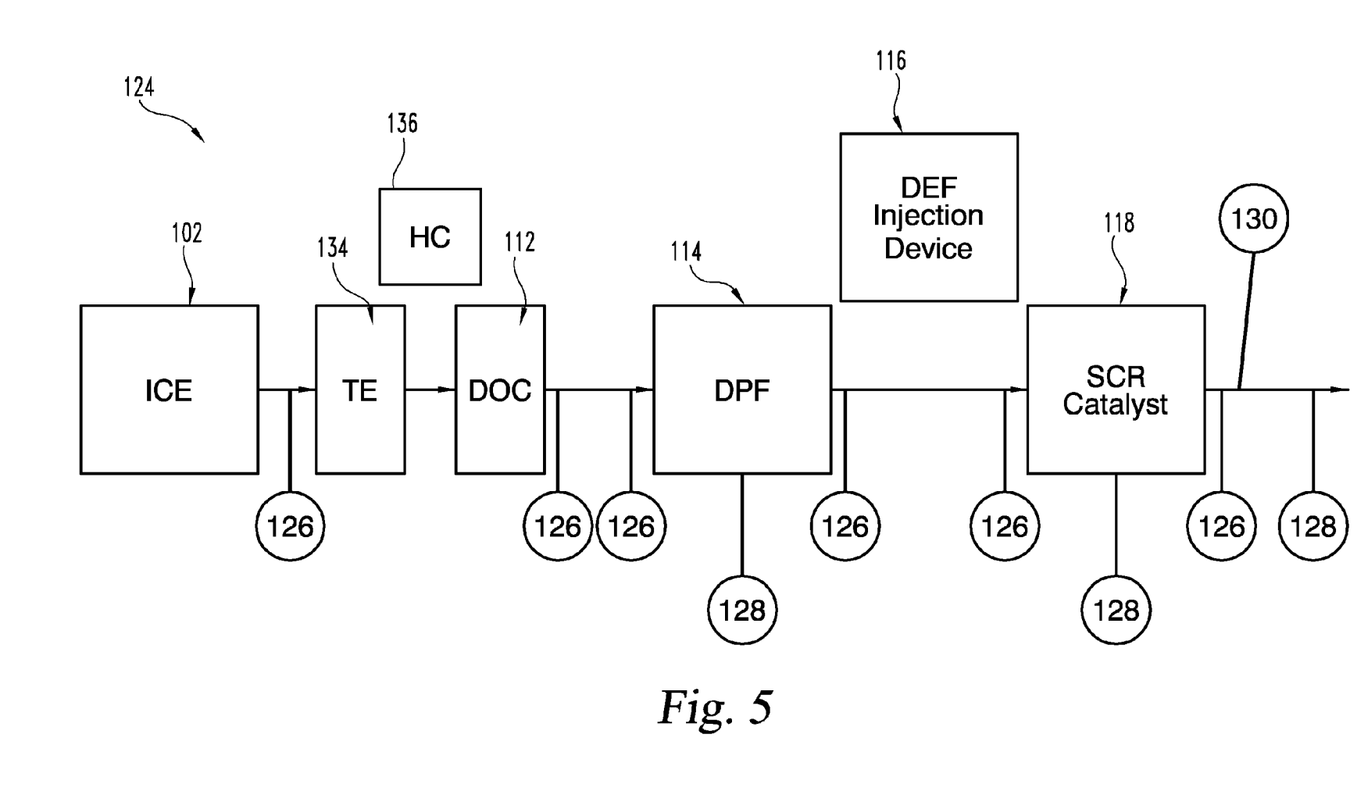
FIG. 5 is a schematic diagram of an exhaust flow path 124.

FIG. 5 is a schematic diagram of an exhaust flow path 124 of the exhaust gas stream from the internal combustion engine (ICE) 102. In one form, the flow path 124 of each module 108 from the engine 102 is arranged such that the exhaust gas stream enters the diesel oxidation catalyst (DOC) 112 first, to reduce carbon monoxide (CO) and hydrocarbons (HC) present in the exhaust gas stream. In other embodiments, the diesel oxidation catalyst 112 may not be the first treatment to which the exhaust gas is exposed. For example, exhaust flow path 124 can include a thermal enhancer or thermal regenerator 134 to maintain DOC 112 in an active condition and raise exhaust gas temperatures. A hydrocarbon (HC) injection device 136 may also be provided for injection of hydrocarbons in the exhaust gas upstream of one or both of thermal enhancer 134 and DOC 112. HC injection device 136 may be connected to the fuel source for engine 102 or to a separate source of hydrocarbons.

In one form, the exhaust flow path 124 continues to the diesel particulate filter (DPF) 114, which reduces the amount of particulates and/or soot in the exhaust gas stream. After the diesel particulate filter 114, a DEF injection device 116 injects a DEF into the exhaust gas stream. Any DEF may be used such as urea. The flow path 124 continues to selective catalytic reduction (SCR) catalyst 118. The DEF and the exhaust gas stream react with the SCR catalyst 118 to reduce NOx (e.g., nitric oxide and nitrogen dioxide). In other embodiments, other treatment sequences may be employed. It is contemplated that some of the exhaust flow path may be used for a turbocharger 107.

If certain emission reduction devices 110 are not needed (e.g., based on the type of engine 102 or application) then those emission reduction devices 110 may be removed and the flow path 124 remains unchanged. With the modular design of the aftertreatment system 104, the incoming flow rate from the engine 102 may be distributed to multiple modules 108 or diesel oxidation catalysts 112 using a flow distribution manifold (not shown). Generally, the exhaust gas stream is evenly distributed among the modules 108 to achieve consistent regeneration of multiple flow paths 124 created by multiple modules 108.

Each module 108 generally includes electronic controls to assure that each module 108 is operating properly. In one embodiment, the controls consist of temperature, pressure, and/or NOx sensors. For example, temperature sensors 126 are located at the inlet and outlet of each emission reducing device 110. A delta pressure sensor 128 is used across the diesel particulate filter 114 and across the SCR catalyst 118. One or both of the delta pressure sensors 128 may be used to predict the pressure drop in each module 108 due to having a common flow distribution manifold and to determine when the diesel particulate filter 114 needs regeneration. A third differential pressure sensor 128 may be provided, for example, at or near the outlet of each module 108 to provide a signal indicating the flow rate through each module 108 so that the differences in flow rates between modules 108 can be monitored.

NOx sensors 130 may be located at the outlet of each module 108 to measure the amount of NOx exiting the module 108 so that the correct amount of DEF may be injected into the module 108 to obtain the required reduction to meet the emission required levels. As shown schematically in FIG. 6, the DEF injection device 116 of each module 108 is connected to a common rail injection, or dosing, system 300. One or more DEF sources and/or pumps 302 may supply pressure to common rail distribution system 300 including DEF injection device 116 at each module 108. Each module 108 generally includes at least one injection device 116 connected to manifold or common rail 304. The controller 106 generally monitors the NOx sensors 130 in all modules 108 and determines which and how much DEF to inject into each module 108 to reduce the NOx levels.

It is contemplated that any of the sensors 126, 128, 130 may be located in other positions such as before, inside, or after a given emission reducing device 110. Furthermore, the sensors 126, 128, 130, such as the delta pressure sensors 128, may be comprised of more than one sensor that is located before, inside, and/or after a given emission reducing device 110. In addition, any of the sensors 126, 128, 130 may be a virtual sensor that extrapolates its measurement based on information from other sensors.

Figure 6:
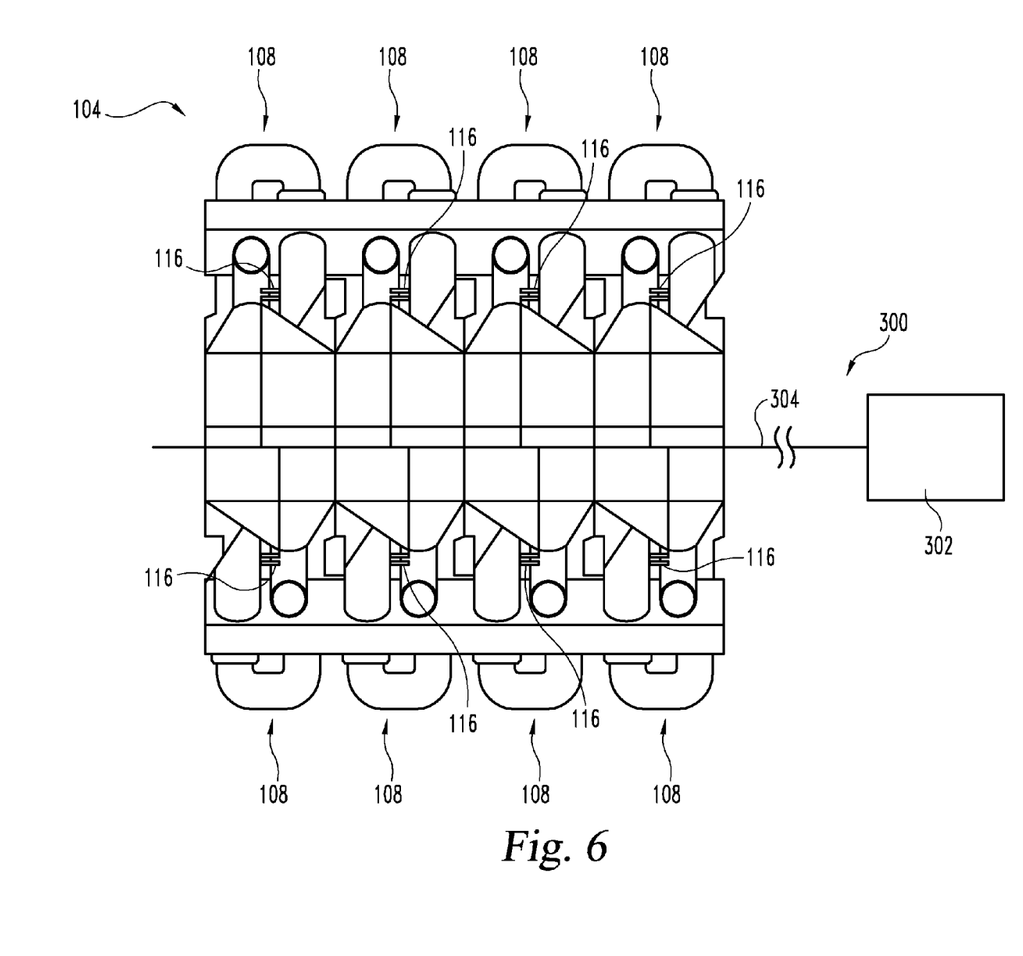
FIG. 6 is a top view of aftertreatment system 104.

FIG. 6 is a top view of the aftertreatment system 104 with eight modules 108. It is contemplated that greater or fewer modules 108 may be used depending on the particular application.

Figure 7:
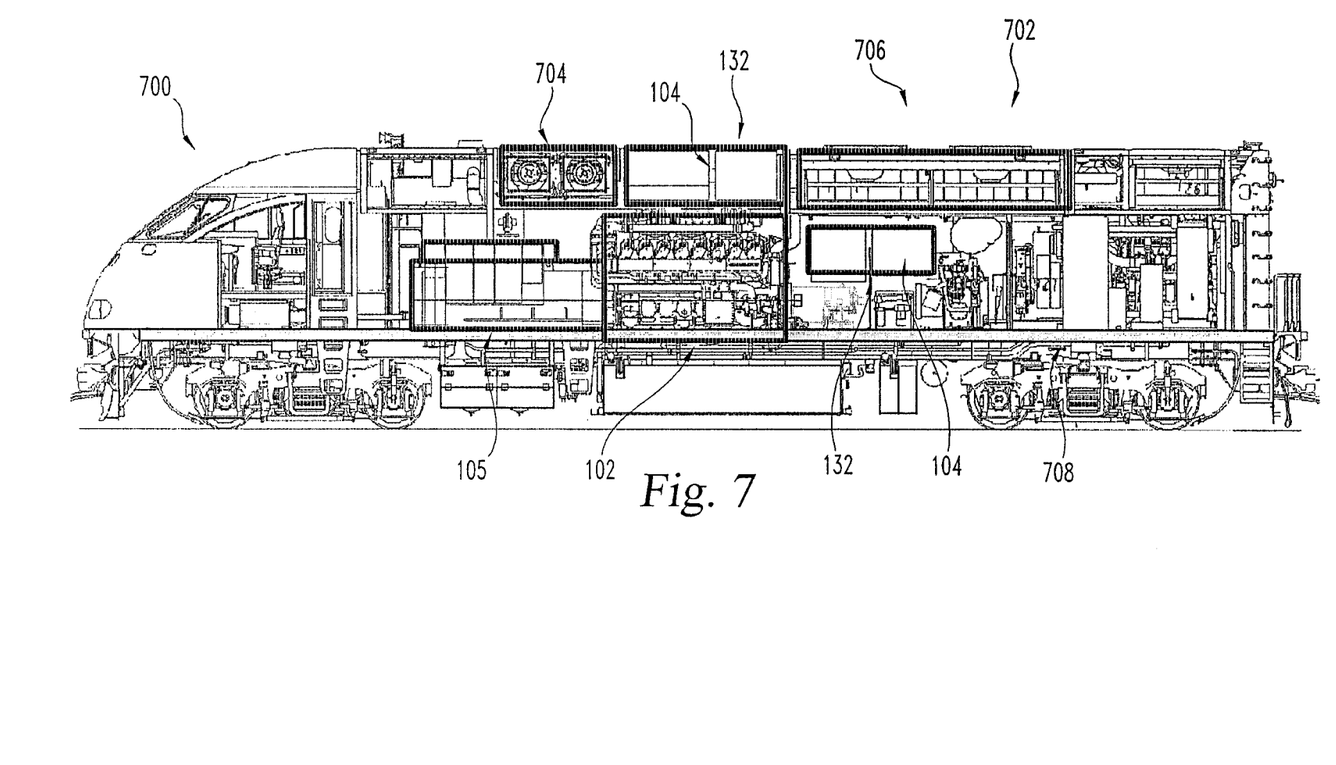
FIG. 7 illustrates a locomotive 702 having aftertreatment system 104.

FIG. 7 illustrates a vehicle 700 such as a locomotive 702 that may include the aftertreatment system 104. The engine 102 may drive the generator 105 to produce electric power, e.g., for vehicle propulsion. The aftertreatment system 104 may be located at various locations 132 as seen in FIG. 7. In one location 132, aftertreatment system 104 is located above engine 102. In another location 132, aftertreatment system 104 is located behind engine 102 opposite generator 105. The locomotive 702 generally also includes a brake 704 and a radiator 706, and an I-beam 708.

Figure 8:
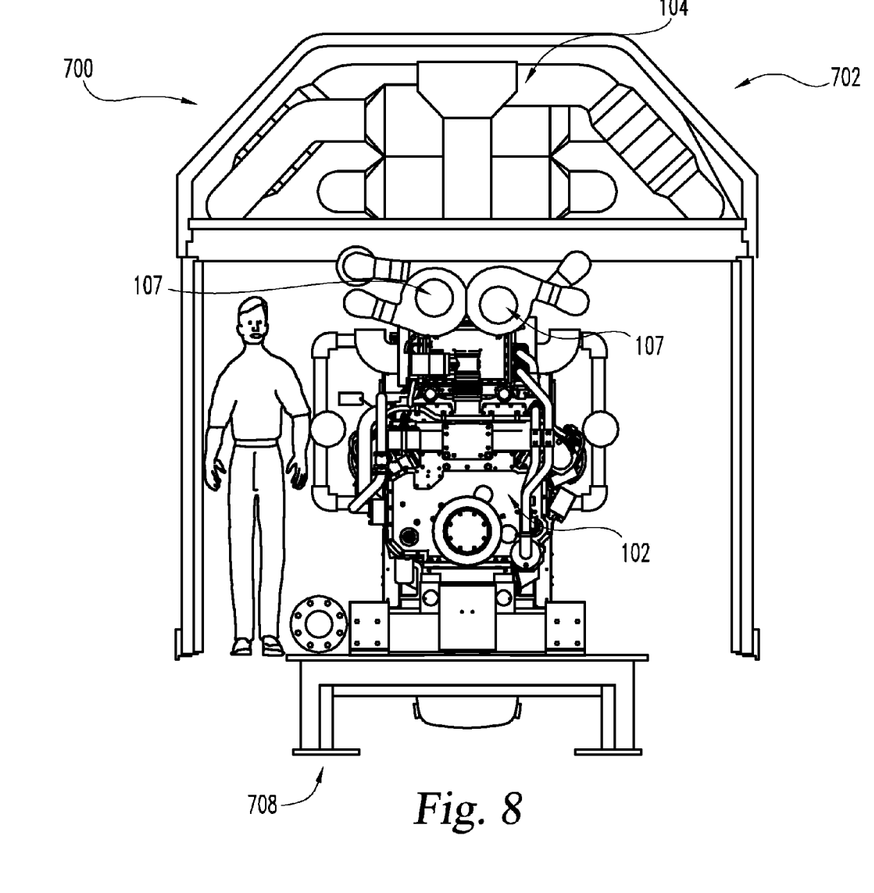
FIG. 8 illustrates locomotive 702 having aftertreatment system 104.
Figure 9:
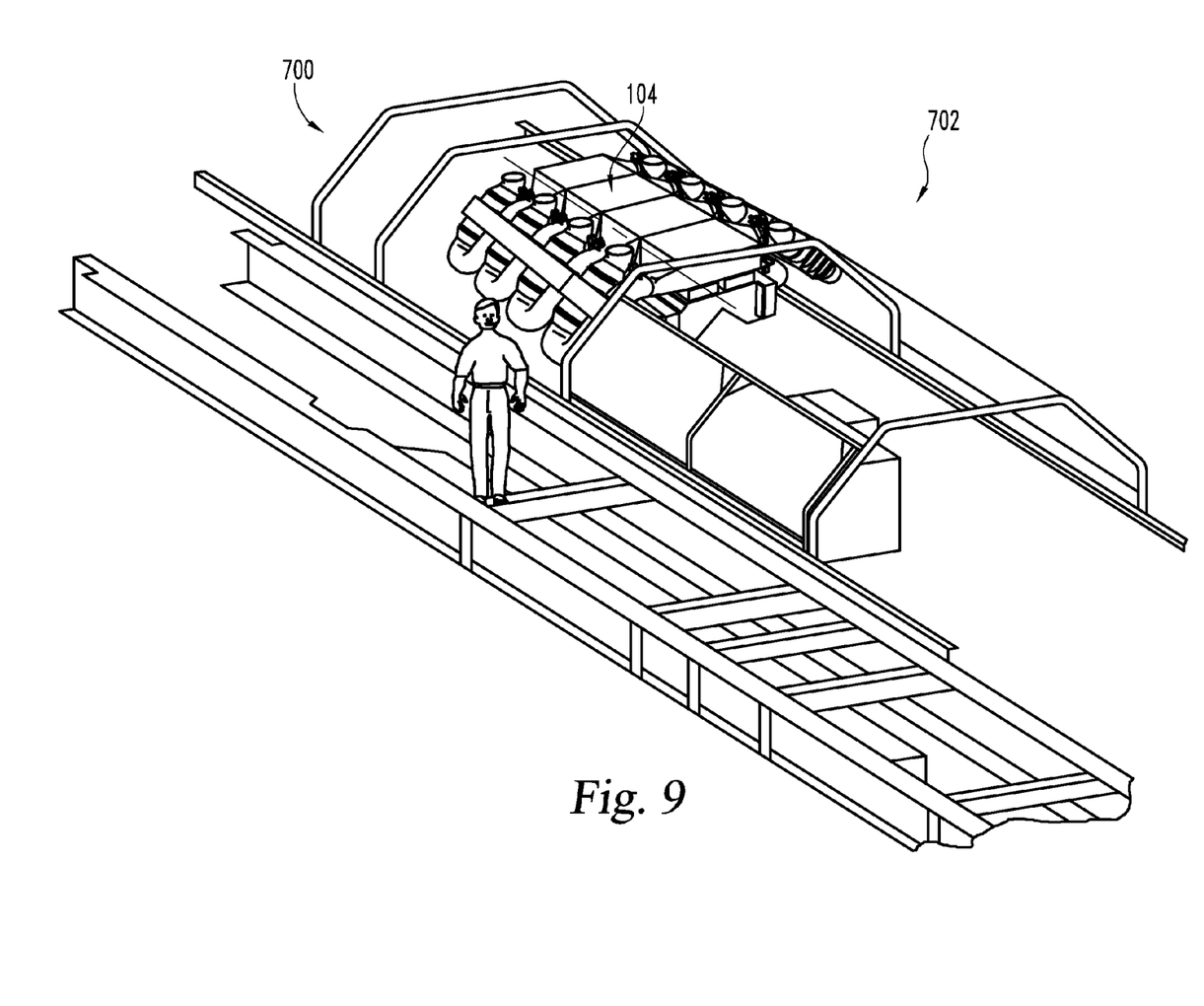
FIG. 9 is a perspective view of locomotive 702 including aftertreatment system 104.

FIG. 8 illustrates another view of the vehicle 700 and locomotive 702 with the aftertreatment system 104 located above the engine 102. It contemplated that the aftertreatment system 104 may be located in other locations. In some embodiments, the engine 102 also includes turbochargers 107. FIG. 9 is a perspective view of a portion of the locomotive 702 that includes the aftertreatment system 104 located above engine 102.

Figure 10:
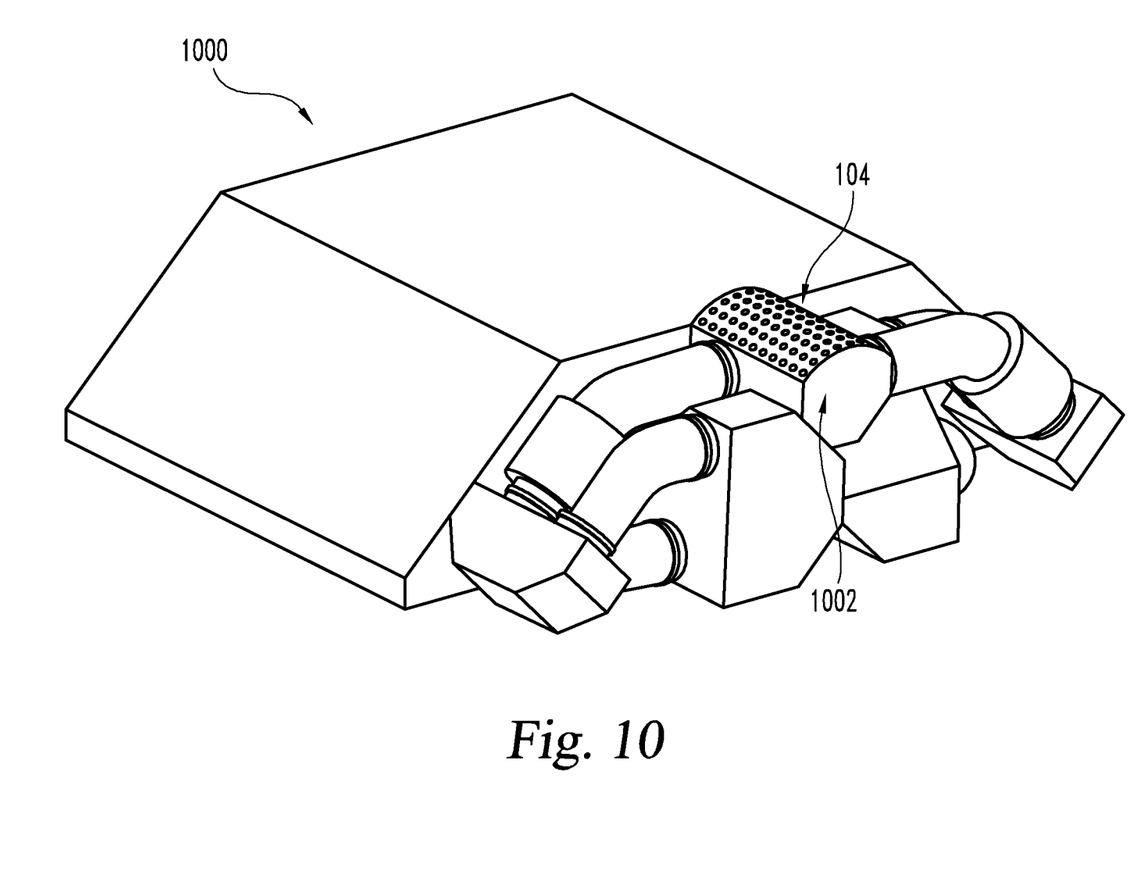
FIG. 10 is a perspective view of another embodiment of an aftertreatment system 1000.

FIG. 10 is a perspective view of another embodiment of the present application illustrating an aftertreatment system 1000. In FIG. 10, the aftertreatment system 1000 includes a muffling device 1002, and in particular, a rain cap 1004, which may provide rain management as well as fire prevention.

FIG. 11 is a schematic diagram of a system 1100 for performing prognostics. With the modular aftertreatment system 104, the information from the electronic controls for the emission reducing devices 110 may be used to perform prognostics such as predictive maintenance or detection of failures before they occur. For example, by having individual modules 108, each module's daily operations may be monitored and this data can be used to predict failures before they happen either on the engine 102 or the aftertreatment system 104. Some types of information or data may include, for example, the number of times the diesel particulate filter needed to be generated, how much DEF was used, and/or the frequency of DEF injections. Then, based on the information, the engine 102 may perform some self diagnostics to attempt to predict a failure before it happens.

Furthermore, in FIG. 11, information from the engine 102 and/or the aftertreatment system 104 may be communicated from the controller 106 to a computer 1102, a handheld diagnostic tool 1104, and/or a server 1106. The computer 1102, the diagnostic tool 1104, the server 1106, and/or a computer 1108 connected to the server 1106 may perform prognostics, as described above, using the information. Moreover, the server 1106 may include a database to store the information for trending and prognostics.

Furthermore, system 1100 may include control of operation of engine 102 and aftertreatment system 104 with controller 106 to enhance operation of modules 108. In one embodiment, controller 106 is connected to a dynamic braking grid 107 of locomotive 702. Controller 106 is configured to load engine 102 to provide electricity for dynamic braking grid 107 and thereby increase exhaust gas temperatures to perform regeneration of DPF 114 and/or SCR catalyst 118 of one or more of the modules 108.

Various aspects and embodiments of the invention disclosed herein are contemplated. According to one aspect, an apparatus includes an internal combustion engine and an aftertreatment system including a plurality of modules configured in a two-dimensional array. Each of the modules is configured to receive a unique portion of an exhaust gas stream from the internal combustion engine and emit the exhaust gas stream to atmosphere. Each of the modules further includes one or more emission reducing devices to reduce a constituent of the exhaust gas stream.

In one embodiment, a number of the plurality of modules corresponds to a number of cylinders of the engine. In another embodiment, the emission reducing devices of each module comprise a diesel particulate filter, a diesel oxidation catalyst, a selective catalytic reduction catalyst, and a DEF injection device upstream of the selective catalytic reduction catalyst. In a refinement of this embodiment, a first pressure sensor is configured to provide a signal indicating a pressure drop in exhaust gas flow across the diesel particulate filter; a second pressure sensor is configured to provide a signal indicating a pressure drop in exhaust gas flow across the selective catalytic reduction catalyst; at least one temperature sensor is configured to provide a signal indicating a temperature of exhaust gas in the module; and a NOx sensor is positioned downstream of the selective catalytic reduction catalyst. In a further refinement of this embodiment, a controller is structured to receive signals from the sensors and to determine and control injection of DEF into the module with the DEF injection device. In yet another refinement of this embodiment, the apparatus includes a vehicle, such as a locomotive, to carry the internal combustion engine, the aftertreatment system, the controller, and the sensors. In yet another refinement, the controller is structured to transmit diagnostic information to a computer.

In another embodiment, the emission reducing devices of one module are different than the emission reducing devices of another module. In yet another embodiment, the apparatus includes a generator driven by the internal combustion engine.

In another embodiment, the aftertreatment system extends along a center line that is generally parallel to an output shaft of the internal combustion engine. The plurality of modules includes at least one module located substantially on a first side of the center line and at least one other module located substantially on a second side of the center line opposite the first side. In one refinement of this embodiment, the aftertreatment system includes at least three modules positioned sequentially along the first side of the center line.

In another embodiment, the aftertreatment system extends along a center line that is generally parallel to an output shaft of the internal combustion engine and a medial side of each of the plurality of modules is located on or toward the center line. In one refinement of this embodiment, each of the plurality of modules includes an emission reducing component subsystem along the medial side of the module connected to receive exhaust gas from the internal combustion engine. A SCR component subsystem is connected to the emission reducing component subsystem opposite the medial side, and the SCR component subsystem is further connected to an exhaust gas outlet. In another refinement of this embodiment, the emission reducing component subsystems includes a diesel oxidation catalyst along an exhaust inlet side of the module and a diesel particulate filter opposite the exhaust inlet side. In yet another refinement of this embodiment, the SCR component subsystem includes plumbing connected to the diesel particulate filter, the plumbing including a first portion that extends laterally away from the medial side of the module and toward the inlet side of the module, the plumbing including an elbow extending from the first portion to orient a second portion of the plumbing extending from the elbow toward an exhaust outlet side of the module and toward the medial side of the module. The SCR component subsystem also includes an SCR catalyst connected to the second portion of the plumbing downstream of the elbow and upstream of the exhaust outlet. In yet a further refinement, a DEF injection device is provided in the first portion of the plumbing.

According to another aspect, a method includes: operating an internal combustion engine to rotate an output shaft that defines a first direction; reducing undesirable constituents of an exhaust gas stream from the internal combustion engine with an aftertreatment system extending along a center line that is substantially parallel to the first direction. The aftertreatment system includes a plurality of modules configured with a first portion of the plurality of modules located substantially on a first side of the center line and a second portion of the plurality of modules located substantially on a second side of the center line. At least one of the first portion and the second portion includes two or more modules positioned sequentially in a direction along the center line. Each of the plurality of modules is configured to receive a unique portion of the exhaust gas stream and each of the modules includes one or more emission reducing devices. The method further includes controlling one or more of the emission reducing devices with a controller.

In one embodiment, the method includes carrying the internal combustion engine, the aftertreatment system, and the controller with a vehicle. In another embodiment, the emission reducing devices of each module comprise a diesel particulate filter, a diesel oxidation catalyst, a DEF injection device, and a selective catalytic reduction catalyst. In a refinement of this embodiment, the method includes regenerating the diesel particulate filter based on information from a pressure sensor. In another refinement of this embodiment, the method includes adjusting an amount of DEF injected into the exhaust gas stream based on information from a NOx sensor configured to provide a NOx level signal, where the NOx sensor is downstream of the selective catalytic reduction catalyst.

According to another aspect, an apparatus includes an internal combustion engine including an output shaft defining a first direction and an aftertreatment system extending along a center line that is substantially parallel to the first direction. The aftertreatment system includes a plurality of modules and each of the modules is configured to receive a unique portion of an exhaust gas stream from the internal combustion engine. Each of the modules includes one or more emission reducing devices to reduce a constituent of the exhaust gas stream and at least a portion of the plurality of modules are arranged sequentially in a direction along the center line. The apparatus further includes means for carrying the internal combustion engine and the aftertreatment system.

In one embodiment, the carrying means comprises a locomotive. In one refinement of this embodiment, the aftertreatment system is supported in the locomotive above the internal combustion engine. In another refinement of this embodiment, the apparatus includes means for generating electrical power connected to the internal combustion engine. In a further refinement, the aftertreatment system is supported in the locomotive one a side of the internal combustion engine opposite the means for generating electrical power.

In another embodiment, the emission reducing devices of each module comprise a diesel particulate filter, a diesel oxidation catalyst, a selective catalytic reduction catalyst, and a DEF injection device upstream of the selective catalytic reduction catalyst. In a refinement of this embodiment, the portion of the plurality of modules that are arranged sequentially along the center line includes three or more modules.

In another aspect, a method includes monitoring a plurality of sensors in an aftertreatment system including a plurality of modules, wherein each of the modules is configured to receive a unique portion of an exhaust gas stream from the internal combustion engine, wherein each of the modules includes one or more emission reducing devices to reduce a constituent of the exhaust gas stream, and wherein the sensors provide information relating to operation of the emission reducing devices; adjusting the operation of at least one of the emission reducing devices based on the information; and predicting a maintenance event for each of the plurality of modules based on the information.

In one embodiment, the method includes storing the information in a computer to perform prognostics and trending. In a refinement of this embodiment, the computer is a server comprising a database. In another embodiment, the method includes removing at least one of the modules from the aftertreatment system; servicing the at least one module; and re-installing the at least one module in the aftertreatment system.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus, comprising:
   an internal combustion engine including an output shaft; and
   an aftertreatment system including a plurality of modules configured in a two-dimensional array, each of the plurality of modules defining a flow path of an exhaust gas stream extending in a first direction transverse to a center line of the internal combustion engine, through an elbow, and in a second direction opposite the first direction,
   wherein the center line of the internal combustion engine is parallel to the output shaft of the internal combustion engine,
   wherein each of the modules is configured to receive a unique portion of the exhaust gas stream from the internal combustion engine, and
   wherein each of the modules includes one or more emission reducing devices to reduce a constituent of the exhaust gas stream.

2. The apparatus of claim 1, wherein a number of the plurality of modules corresponds to a number of cylinders of the engine.

3. The apparatus of claim 1, wherein the emission reducing devices of each module comprise at least one of a diesel particulate filter, a diesel oxidation catalyst, a hydrocarbon injection system, a selective catalytic reduction catalyst, a DEF injection device upstream of the selective catalytic reduction catalyst, and at least one of a thermal enhancer and a thermal regenerator.

4. The apparatus of claim 3, further comprising:
   a first differential pressure sensor configured to provide a signal indicating a pressure drop in exhaust gas flow across the diesel particulate filter;
   a second differential pressure sensor configured to provide a signal indicating a pressure drop in exhaust gas flow across the selective catalytic reduction catalyst;
   a third differential pressure sensor configured to provide a signal indicating a difference in flow rates through each module;
   at least one temperature sensor configured to provide a signal indicating a temperature of exhaust gas in the module; and
   a NOx sensor downstream of the selective catalytic reduction catalyst.

5. The apparatus of claim 4, further comprising:
   a controller structured to receive signals from the sensors, wherein the controller is structured to determine and control injection of DEF into the module with the DEF injection device.

6. The apparatus of claim 5, further comprising:
   a vehicle to carry the internal combustion engine, the aftertreatment system, the controller, and the sensors.

7. The apparatus of claim 6, wherein the vehicle is a locomotive.

8. The apparatus of claim 5, wherein the controller is structured to transmit diagnostic information to a computer.

9. The apparatus of claim 1, wherein the emission reducing devices of one module are different than the emission reducing devices of another module.

10. The apparatus of claim 1, further comprising:
    a generator driven by the internal combustion engine.

11. The apparatus of claim 1, wherein:
    the aftertreatment system extends along the center line; and
    the plurality of modules includes at least one module located on a first side of the center line and at least one other module located on a second side of the center line opposite the first side.

12. The apparatus of claim 11, wherein the aftertreatment system further includes at least three modules arranged sequentially along the first side of the center line.

13. The apparatus of claim 1, wherein a medial side of each of the plurality of modules is located on or toward the center line.

14. The apparatus of claim 13, wherein each of the plurality of modules includes:
    an emission reducing component subsystem along the medial side of the module connected to receive exhaust gas from the internal combustion engine; and
    a SCR component subsystem connected to the emission reducing component subsystem opposite the medial side, and the SCR component subsystem is further connected to an exhaust gas outlet.

15. The apparatus of claim 14, wherein the emission reducing component subsystems includes a diesel oxidation catalyst along an exhaust inlet side of the module and a diesel particulate filter opposite the exhaust inlet side.

16. The apparatus of claim 15, wherein the SCR component subsystem includes:
    plumbing connected to the diesel particulate filter, the plumbing including a first portion that extends in the first direction laterally away from the medial side of the module and toward the inlet side of the module, the plumbing including an elbow extending from the first portion to orient a second portion of the plumbing extending in the second direction from the elbow toward an exhaust outlet side of the module and toward the medial side of the module; and
    an SCR catalyst connected to the second portion of the plumbing downstream of the elbow and upstream of the exhaust outlet.

17. The apparatus of claim 16, further comprising a DEF injection device in the first portion of the plumbing.

18. The apparatus of claim 1, wherein each of the modules includes a DEF injection device and further comprising a DEF injection system including a common rail connecting each of the DEF injection device to a source of DEF.

19. An apparatus, comprising:
    an internal combustion engine including an output shaft;
    an aftertreatment system extending along a center line that is parallel to the output shaft, wherein the aftertreatment system includes a plurality of modules and each of the modules is configured to receive a unique portion of an exhaust gas stream from the internal combustion engine, wherein each of the modules includes one or more emission reducing devices to reduce a constituent of the exhaust gas stream, and wherein at least a portion of the plurality of modules are arranged sequentially in a direction along the center line, each of the plurality of modules defining a flow path of an exhaust gas stream extending in a first direction transverse to the center line, through an elbow, and in a second direction opposite the first direction; and means for carrying the internal combustion engine and the aftertreatment system.

20. The apparatus of claim 19, wherein the carrying means comprises a locomotive.

21. The apparatus of claim 20, wherein the aftertreatment system is supported in the locomotive above the internal combustion engine.

22. The apparatus of claim 20, further comprising:
means for generating electrical power connected to the internal combustion engine.

23. The apparatus of claim 22, wherein the aftertreatment system is supported in the locomotive one a side of the internal combustion engine opposite the means for generating electrical power.

24. The apparatus of claim 19, wherein the emission reducing devices of each module comprise a diesel particulate filter, a diesel oxidation catalyst, a selective catalytic reduction catalyst, and a DEF injection device upstream of the selective catalytic reduction catalyst.

25. The apparatus of claim 24, wherein the portion of the plurality of modules arranged sequentially along the center line includes three or more modules.

26. A method, comprising:
operating an internal combustion engine to rotate an output shaft;
providing an aftertreatment system extending along a center line that is parallel to the output shaft, the aftertreatment system including a plurality of modules configured with a first portion of the plurality of modules located on a first side of the center line and a second portion of the plurality of modules located on a second side of the center line,
wherein at least one of the first portion and the second portion includes two or more modules arranged sequentially in a direction along the center line,
wherein each of the plurality of modules defines a flow path of an exhaust gas stream extending in a first direction transverse to the center line, through an elbow, and in a second direction opposite the first direction, and
wherein each of the modules includes one or more emission reducing devices;
flowing a unique portion of an exhaust gas stream from the internal combustion engine through each of the plurality of modules; and
controlling one or more of the emission reducing devices with a controller.

27. The method of claim 26, further comprising:
carrying the internal combustion engine, the aftertreatment system, and the controller with a vehicle.

28. The method of claim 26, wherein the emission reducing devices of each module comprise at least one of a diesel particulate filter, a diesel oxidation catalyst, a DEF injection device, a selective catalytic reduction catalyst, and a thermal regenerator or thermal enhancer.

29. The method of claim 28, further comprising:
regenerating the diesel particulate filter based on information from a pressure sensor.

30. The method of claim 28, further comprising:
adjusting an amount of DEF injected into the exhaust gas stream based on information from a NOx sensor configured to provide a NOx level signal, wherein the NOx sensor is downstream of the selective catalytic reduction catalyst.

31. A method, comprising:
operating an internal combustion engine to rotate an output shaft;
flowing an exhaust gas stream from the internal combustion engine through an aftertreatment system comprising a plurality of modules,
wherein each of the modules is configured to receive a unique portion of the exhaust gas stream,
wherein each unique portion of the exhaust gas stream flows in a first direction transverse to the output shaft of the internal combustion engine, through an elbow, and in a second direction opposite the first direction, and
wherein each of the modules includes one or more emission reducing devices to reduce a constituent of the exhaust gas stream;
monitoring a plurality of sensors in the aftertreatment system wherein the sensors provide information relating to operation of the one or more emission reducing devices;
adjusting the operation of at least one of the one or more emission reducing devices based on the information; and
predicting a maintenance event for each of the plurality of modules based on the information.

32. The method of claim 31, further comprising:
storing the information in a computer to perform prognostics and trending.

33. The method of claim 32, wherein the computer is a server comprising a database.

34. The method of claim 31, further comprising:
removing at least one of the modules from the aftertreatment system;
servicing the at least one of the modules; and
re-installing the at least one of the modules in the aftertreatment system.

* * * * *